United States Patent [19]

Rodowsky, Jr. et al.

[11] 4,399,638

[45] Aug. 23, 1983

[54] SWITCHING SYSTEM FOR AN AIR-DRIVEN TOOL

[75] Inventors: Stanley Rodowsky, Jr.; R. Kent Nicholson, both of Baltimore, Md.

[73] Assignee: Black & Decker Inc., Newark, Del.

[21] Appl. No.: 298,309

[22] Filed: Sep. 1, 1981

[51] Int. Cl.³ .............................................. B24B 23/00
[52] U.S. Cl. .................................. 51/170 R; 55/310; 55/313; 15/387; 415/26
[58] Field of Search ......... 51/170 T, 170 R, 170 MT, 51/170 PT, 177, 180; 415/26, 27, 28; 15/354, 375, 387; 55/310, 312, 313

[56] References Cited

U.S. PATENT DOCUMENTS

| | | | |
|---|---|---|---|
| 1,323,925 | 12/1919 | Stewart | 15/375 |
| 2,904,816 | 9/1959 | Skolfield | 15/375 |
| 2,904,817 | 9/1959 | Brennan | 15/375 |
| 3,071,799 | 1/1963 | Jepson et al. | 15/387 |

*Primary Examiner*—Roscoe V. Parker
*Attorney, Agent, or Firm*—R. B. Sherer; Harold Weinstein; C. E. Yocum

[57] ABSTRACT

A turbine-driven sander includes a switching system having a double-flap valve adjacent a passageway intermediate the turbine and a source of vacuum. One flap valve is a toggle which is actuated to open or close a bypass aperture, and which is connected to close and open, respectively, the other flap valve, which is mounted in the passageway. When the toggle opens the bypass aperture the turbine stops; conversely, when the toggle closes the bypass aperture, the turbine becomes activated and remains activated until the toggle opens the bypass aperture or the source of vacuum is removed or no longer produces a vacuum. When activated, the turbine vibrates a platen through a direct drive system.

21 Claims, 12 Drawing Figures

SWITCHING SYSTEM FOR AN AIR-DRIVEN TOOL

CROSS REFERENCE TO RELATED APPLICATIONS

The subject matter of this patent application is related to that disclosed in U.S. patent applications Ser. Nos. 06/298,308, 06/298,310, 06/298,311 and 06/298,312, each filed on Sept. 1, 1981, and assigned to the same assignee as the present application.

BACKGROUND OF THE INVENTION

1. Field of the Invention

This invention relates to air-powered tools, and more particularly to a hand-held turbine-driven orbital sander having a normally "off" double valve switch which reacts to pressure differential and biasing means to remain "on" after communicating the turbine with a source of vacuum.

2. Description of the Prior Art

Turbine driven vacuum cleaners have used various manually-operated gates and valves to regulate air flow through air chambers.

U.S. Pat. No. 1,323,925 shows a manually-adjusted gate at the end of a brush housing which changes the volume of air into the turbine cylinder.

U.S. Pat. No. 2,904,816 shows two independently operating valves, one of which is moveable to one of several positions to restrict airflow to the brush; it must be fixed in each position by a control knob. The other valve is spring-biased closed, but opens to reduce vacuum pressure between the nozzle and a rug.

U.S. Pat. No. 2,904,817 illustrates a single valve mounted between a turbine chamber and an outlet chamber. Again, it is held in various positions by a control knob.

SUMMARY OF THE INVENTION

A switching system for a turbine-driven tool connected to a source of vacuum includes a double-flap valve adjacent a passageway intermediate the turbine and the source of vacuum. One flap is a toggle connected to the housing, and which an operator actuates to open or close a bypass aperture, which also simultaneously closes and opens, respectively, the second flap valve, which is mounted in the passageway. When the toggle opens the bypass aperture the turbine stops; conversely, when the toggle closes the bypass aperture, the turbine becomes activated and remains activated until the toggle opens the bypass aperture or the source of vacuum is removed or no longer produces a vacuum.

It is an object of the present invention to provide a switching system for a turbine-driven tool which overcomes the prior art disadvantages; which is simple, economical and reliable; which has passageway means in a housing to communicate the turbine with the source of vacuum; which housing includes aperture means for communicating ambient air with the source of vacuum; which coact with bypassing means for selectively switching the air flowing to the source of vacuum; which bypassing means include a double flap valve; which has a lower valve pivotally mounted in the passageway means; which is linked to an upper flap valve pivotally connected to the housing; which includes a toggle which opens and closes the aperture means; which toggle remains closed responsive to a pressure differential across the aperture; which toggle is opened responsive to biasing means urging the system to a normally "off" condition.

Other objects and advantages will be apparent from the following description of one embodiment of the invention; the novel features will be particularly pointed out hereinafter in the claims.

BRIEF DESCRIPTION OF THE DRAWINGS

The invention is illustrated in the accompanying drawings in which.

DESCRIPTION OF THE PREFERRED EMBODIMENT

Figure 1:
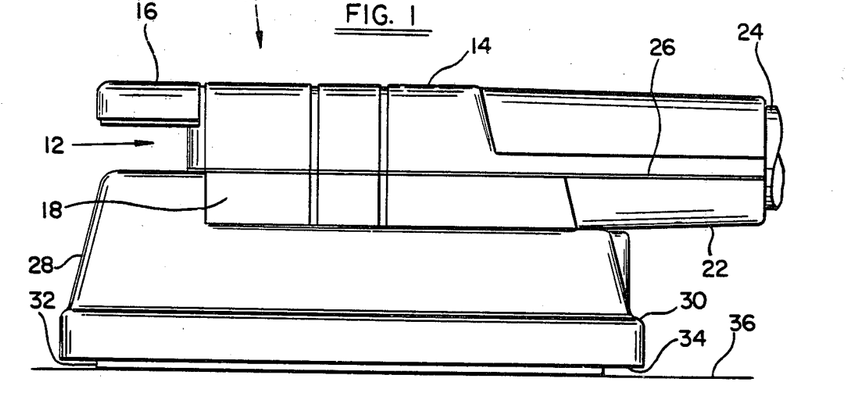
FIG. 1 is a side elevational view of a sanding tool embodying the present invention.
Figure 2:
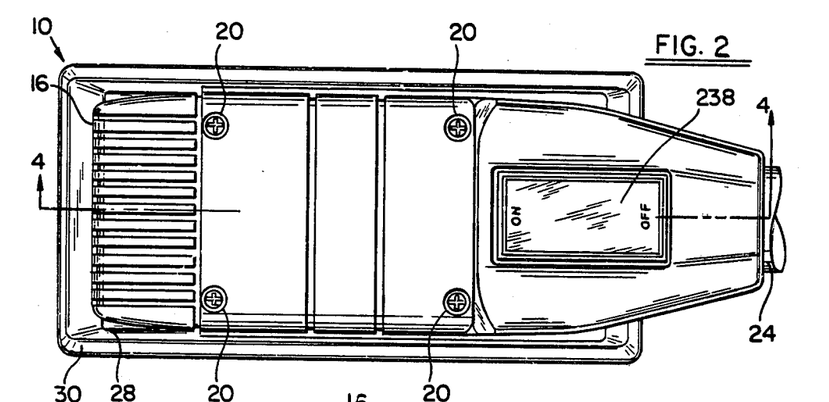
FIG. 2 is a plan view of the sanding tool embodying the present invention.
Figure 3:
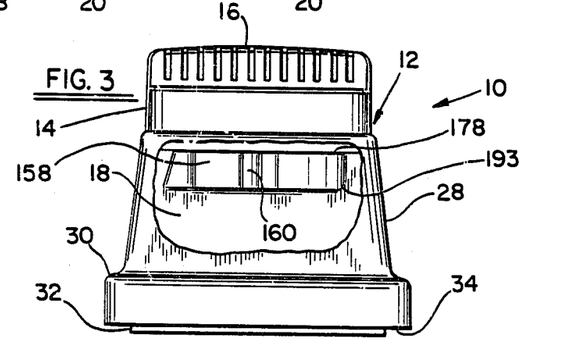
FIG. 3 is a front elevational partially cutaway view of the sanding tool of FIG. 1, illustrating the turbine nozzle air inlet.

Referring to FIGS. 1, 2 and 3, a turbine-powered orbital sander referred to generally as 10 is shown embodying the present invention. A streamlined exterior sander housing assembly 12 includes three one-piece molded plastic members. The first member, an upper handle 14 having a ribbed front handgrip 16, is secured to the second member, a lower housing 18, by fasteners 20. The third member is a tapered vacuum line receptacle 22 mounted beneath the rear of the upper handle 14, and connected to a fitting 24 of an air hose leading to a vacuum source (not shown). The three housing members 14, 18 and 22, are joined along a common boundary 26. A one-piece dust shroud 28 is mounted on the lower housing 18. The dust shroud 28 has a flared portion 30 which is spaced outwardly from platen 32 so that a bottom edge 34 of the shroud 28 is suspended just above worksurface 36.

Figure 4:
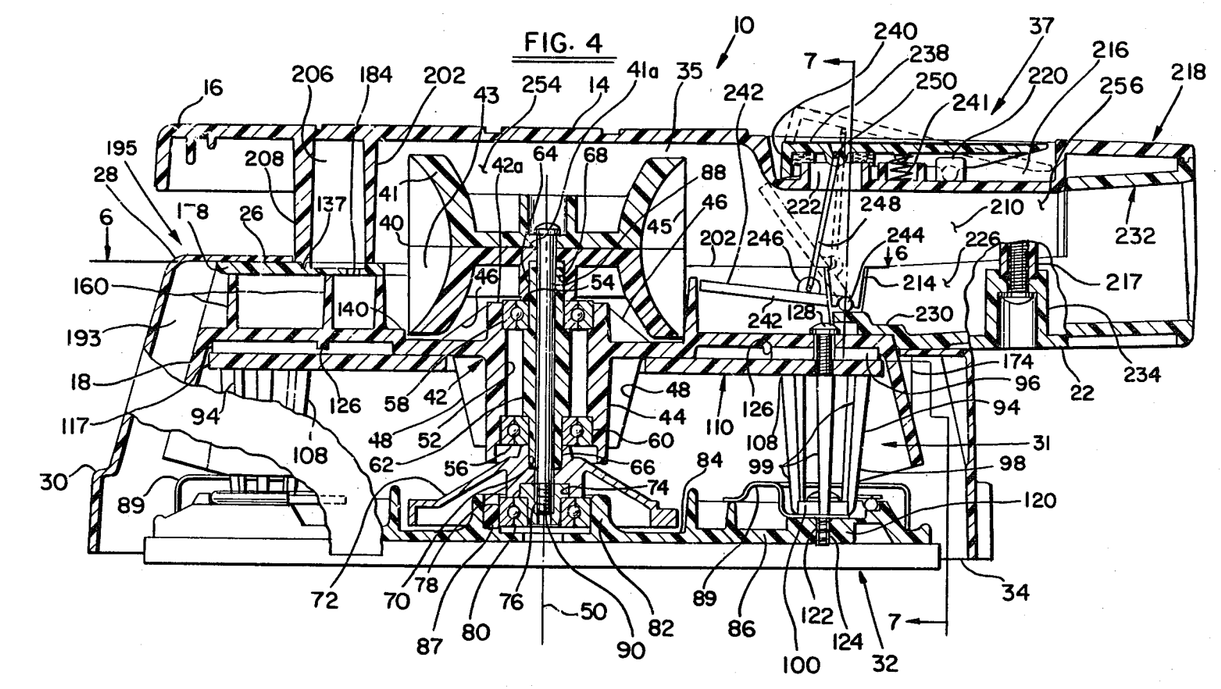
FIG. 4 is a side elevational sectional view, partially cutaway, taken along line 4—4 of FIG. 2.
Figure 5:
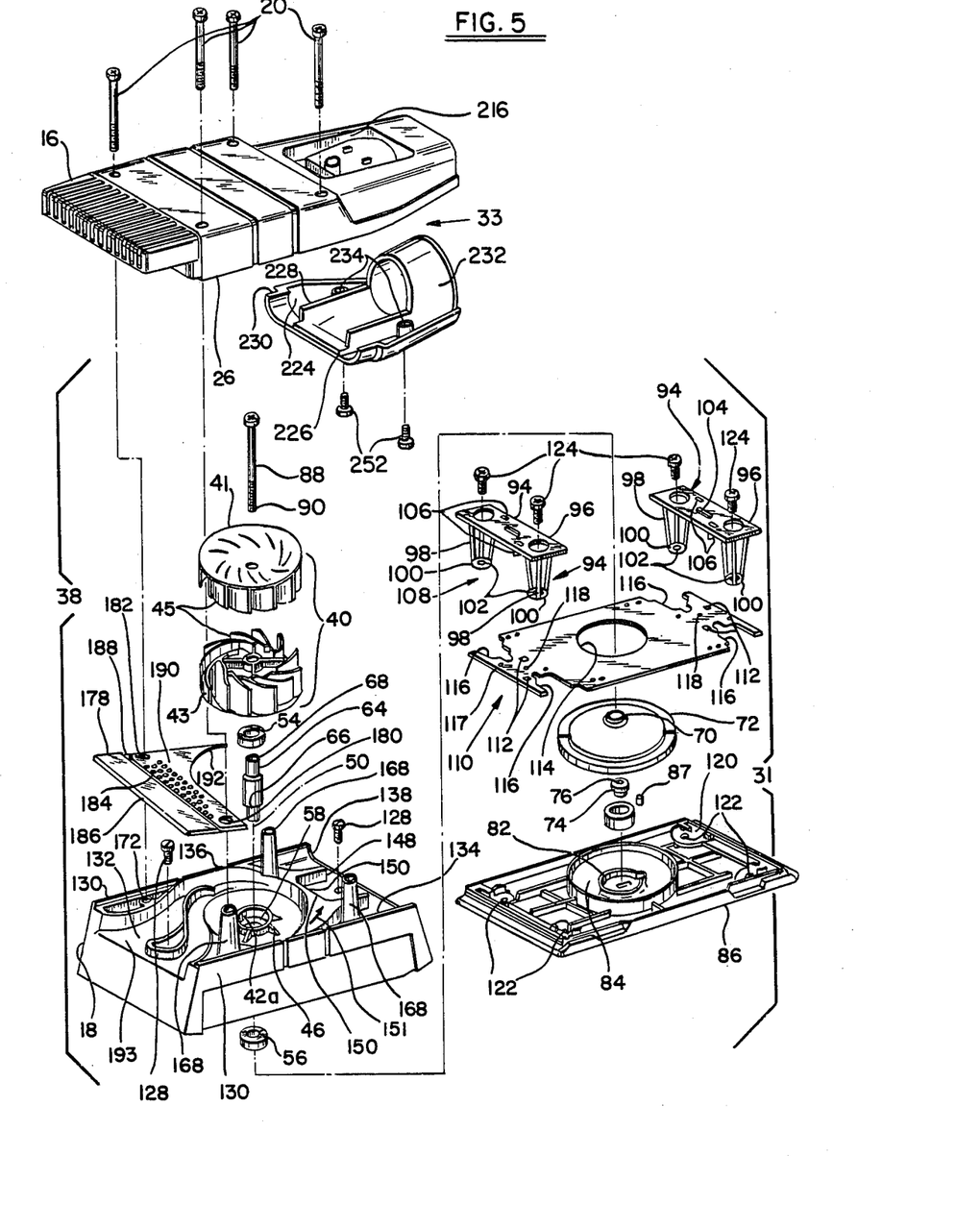
FIG. 5 is a exploded perspective view of the sanding tool, illustrating the switching system of the present invention.

As shown in FIGS. 4 and 5, housing assembly 12 encloses several systems which coact to produce the present sander 10. A flexible, four-point suspension system 31 supports the sander housing 12, which encloses an easily-assembled interfit system 33. The interfit system 33 defines a set of air chambers 35 which guide air flow to a switching system 37 with a minimum of turbine noise. The switching system 37 permits the operator to quickly engage and disengage a turbine direct drive system 38, without having to connect and disconnect the sander 10 and the fitting 24. When engaged, the drive system 38 interacts with the suspension system 31 to yield the sander's oscillating motion.

The first system to be described is the turbine direct-drive system 38. FIGS. 4 and 5 illustrate a turbine 40 constructed of a turbine upper half 41 interlocked as at 41a with a turbine lower half 43. A plurality of turbine vanes 45 are configured such that air entering the turbine lower half 43 exits from the turbine upper half 41.

The turbine 40 is mounted in the housing assembly 12 using a minimum of components. A hub 42 is formed with an upper hub portion 42a and a lower hub portion 44, which are integrally molded on the lower housing 18. A plurality of upper ribs 46 and lower ribs 48 are also integrally molded on lower housing 18 and provide additional support for hub 42. The hub 42 is located concentrically about a turbine axis 50, and defines a bore 52, also located concentrically about the turbine axis 50. Upper and lower ball bearings 54, 56 are pressed into upper and lower counterbores 58, 60, respectively, in bore 52 such that their respective axes of rotation are coincident with turbine axis 50.

A one-piece thermoplastic shaft 62 has a reduced diameter upper portion 64 and a similar reduced diameter lower portion 66. The shaft 62 defines a longitudinal clearance bore 68. Upper and lower portions 64, 66 are mounted in bearings 54, 56, respectively, such that the longitudinal centerline of clearance bore 68 is coincident with turbine axis 50. The turbine 40 is mounted onto the upper portion 64 of shaft 62; a top 70 of counterweight 72 is mounted onto the lower portion 66. Therefore the one-piece shaft 62 and its support structure provides a rapid alignment of counterweight 72 with turbine 40, along the turbine axis 50.

A bushing 74, shown in FIGS. 4 and 5, having a threaded bore 76 is located eccentrically in a counterweight hub 78. The bushing 74 is also pressed into a counterweight bearing 80. Bearing 80 is mounted in a hub 82 formed on upper surface 84 of a baseplate 86, and is trapped therein by plug 87. Platen 32 is attached to the baseplate 86.

The drive system 38 is assembled by inserting an elongated machine screw 88 having a threaded end 90 through the turbine 40, clearance bore 68, and counterweight 72, and into threaded engagement with bore 76 of bushing 74. When the screw 88 is tightened, it adds rigidity to the drive system components by placing them in slight compression.

The resultant drive system 38 is now aligned about a single axis 50. As turbine 40 rotates, it rotates shaft 62 and bushing 74, which in turn drives counterweight 72 and baseplate 86, thereby providing an oscillatory sanding motion to platen 32. An abrasive strip or sandpaper is attached to baseplate 86 via clamps 89, which are of conventional designs.

In addition to being connected to the baseplate 86 through the drive system 38 as described above, the lower housing 18 is supported upon the baseplate through the four-point suspension system 31, which provides both support and flexibility so that the suspension system 31 coacts with the drive system 38 to distribute the orbital sanding action about the platen 32.

The suspension system 31 includes two platen support members 94 as best seen in FIG. 5. Each platen support member 94 is a molded plastic body in the shape of an inverted "U" in which a flat cross-member 96 supports at each end a flexible post 98. Flexible post 98 in turn includes a plurality of downwardly extending flexible fingers 99 terminating in a disc 100 having a mounting hole 102. A longitudinal mounting slot 104 is formed in the cross-member 96 midway between each flexible post 98. Two downwardly-extending locking tabs or snaps 106 are formed diagonally between the flexible posts 98 and the mounting slot 104. Again referring to FIG. 5, a suspension subassembly 108 is created when two platen support members 94 are temporarily connected to a mounting member, such as a metal mounting plate 110. The metal mounting plate 110 has four locking apertures 112 so spaced as to receive the snaps 106 of the platen support members 94. The metal mounting plate 110 also includes a central clearance orifice 114, four corner cutouts 116, which extend in pairs towards each other from opposite sides adjacent the end 117 thereof, and a threaded mounting hole 118 formed inwardly of the end 117. The subassembly 108 is completed when the two platen support members 94 are snapped into the apertures 112 of the metal plate 110. The subassembly 108 now can be easily moved to and aligned with the other components of the suspension system 31 and the drive system 38.

During final assembly of the suspension system 31, subassembly 108 is attached to the baseplate 86 and then to the upper housing 18. A raised boss 120, shown in FIGS. 4 and 5, having a threaded aperture 122 is formed at each corner of the upper surface 84 of baseplate 86. A fastener 124 is inserted through each disc mounting hole 102 and into threaded engagement with each threaded aperture 122 of baseplate 86. The subassembly 108 is then positioned against the lower housing 18 such that the cross-member 96 of each platen support member 94 is located in a mating recess 126 formed beneath the lower housing 18, and clearance orifice 114 is placed around ribs 48. Then a pair of fasteners 128 are inserted through the lower housing 18, the mounting slot 104, and into threaded engagement with holes 118 of metal plate 110, the slot 104 enhancing ease of alignment. When fasteners 128 are tightened they secure the platen support members 94 to the lower housing 18 by firmly sandwiching the platen support members 94 between the metal plate 110 and the lower housing 18. The drive system 38 is now axially entrapped therebetween but free to rotate about the axis 50. Nevertheless, when the baseplate 86 is vibrated responsive to the orbital motion of the drive system 38, the flexible posts 98 of the suspension system 31 flex to accomodate such motion, while maintaining the axial distance of the drive system 38.

Having described the drive system 38 and suspension system 31, it is now appropriate to describe how a minimum of housing components interfit to guide and control air flow and to abate turbine noise, thereby powering the drive system 38.

Figure 6:
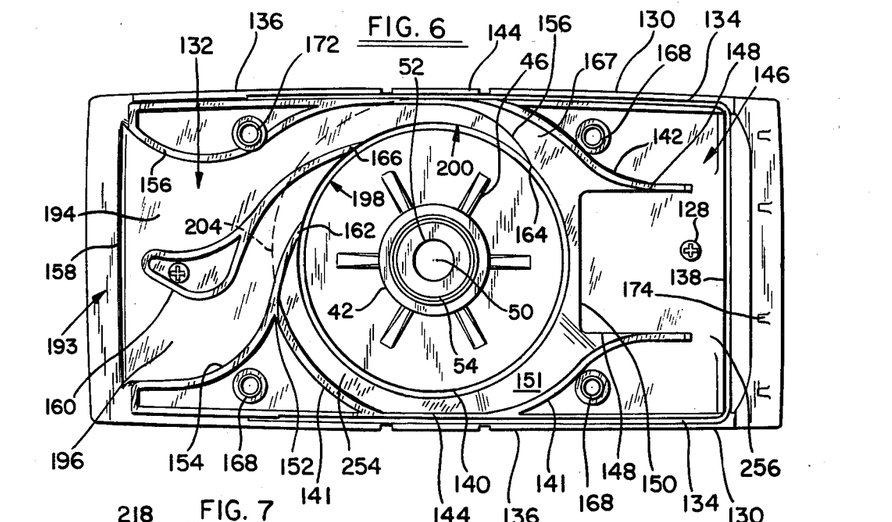
FIG. 6 is a detail plan view of a lower housing member, taken along line 6—6 of FIG. 4.

Referring to FIGS. 4, 5 and 6, the air-control portion 129 of the lower housing 18 has two longitudinal integrally-molded exterior walls 130 of uniform height extending from a lower housing floor 132 to the horizontal plane of the common boundary 26. A shallow groove 134 is formed in the upper edges 136 of the walls 130 to accomodate a complementary peripheral sealing tongue 135 on upper handle 14. A similar shallow groove 138 is also formed in the floor 132 transverse to and intersecting the groove 134.

As shown in FIG. 6, a circular lower turbine well 140 is formed concentrically about turbine axis 50. Two sections 141, 142 of a curved turbine chamber wall merge with the exterior walls 130 at its midpoints 144, and curve inwardly to the exhaust end 146 of the lower housing 18, where they join switch chamber side walls 148. Walls 148 extend transversely to and rearwardly from switch chamber wall 150. The floor 132 slopes upwardly between wall 141 and well 140, as indicated by arrow 151 of FIG. 6. Wall 141 extends forwardly until it reaches junction 152 with a first nozzle wall 154. Nozzle wall 154 and a second nozzle wall 156 form the sides of a turbine air inlet 158 (see FIG. 3). A nozzle air-dividing wall 160 is located generally intermediate the nozzle walls 154, 156. All three nozzle walls 154, 156, 160 describe "S"-shaped paths converging rearwardly of the turbine air inlet 158. Walls 154 and 156 intersect the lower turbine well 140 at junctions 162, 164 respectively. Wall 160 stops at a point 166 on the arc intermediate the intersections 154, 156. A horizontal platform 167 is formed between nozzle wall 156 and turbine chamber wall 142, and merges with upward slope 151 of floor 132.

For strength and ease of alignment and assembly, three upwardly-extending, generally conical posts 168 are molded into the floor 132, as shown best in FIG. 5, and make up three support members of the housing interfit system 33. A short, internally threaded boss 172 extends upwardly to approximately the height of nozzle wall 156, as shown in FIGS. 5 and 6.

To complete the structure of lower housing 18 a plurality of vertical ribs 174 are formed on a rear surface 176 of the lower housing 18, thereby supplying additional support for the dust shroud 28.

A sub-element of the interfit system 33 is a nozzle cover plate 178, in each side of which are formed large and small mounting holes 180, 182, respectively, as shown in FIG. 5. A plurality of noise attenuation holes 184 are formed in the cover plate 178 generally intermediate the mounting holes 180, 182. Forwardly of the noise attenuation holes 184 is a generally rectangular front section 186, in which is also formed a continuation 188 of the groove 134. A generally arcuate section 190 of the cover plate 178, having a flashed edge 192, extends rearwardly of the noise attentuation holes 184, adjacent the small mounting hole 182.

As shown in FIGS. 5 and 6, when the nozzle cover plate 178 is assembled on the lower housing 18, the large mounting hole 180 is placed over one of the threaded posts 168, the small mounting hole 182 is positioned over boss 172, and flashed edge 192 is placed over points 162, 164 and 166 along the arc of the turbine well 140. Then the cover plate 178 is lowered onto the lower housing 18. The resultant structure is a nozzle 193 having two channels 194, 196 which direct air to two entrances 198, 200 respectively, along the lower turbine well 140. The flashed edge 192 provides an air seal at the entrances 198, 200. The inlet nozzle 193 is one element of a turbine noise attenuation subsystem, shown generally as 195 in FIG. 4.

Referring to FIGS. 4 and 6, another interfit member is upper handle 14, which includes a second element of the noise attenuation subsystem 195. Handle 14 defines a generally circular wall 202, which follows a continuous contour traced by turbine chamber walls 141, 142 and the curve (in phantom) 204. Now referring to FIG. 4, adjacent the handgrip 16, a rectangular side branch resonator 206 is located between the circular wall 202 and exterior wall 208. A downwardly-extending post (not shown), similar to the upwardly extending posts 168, is recessed in the upper handle 14 adjacent the side branch resonator 206, such that it complements boss 172 of lower housing 18. This post is the fourth support member for the interfit system 33.

As shown in FIG. 4, when the upper handle 14 is assembled to the lower housing 18, the side branch resonator 206 is positioned over the noise attenuation holes 184 of the inlet nozzle 193. The noise attenuation holes 184 and side branch resonator 206 coact to minimize turbine noise; this combination in turn coacts with the inlet noise-attenuating nozzle 193 to provide the turbine noise attenuation sybsystem 195.

Figure 7:
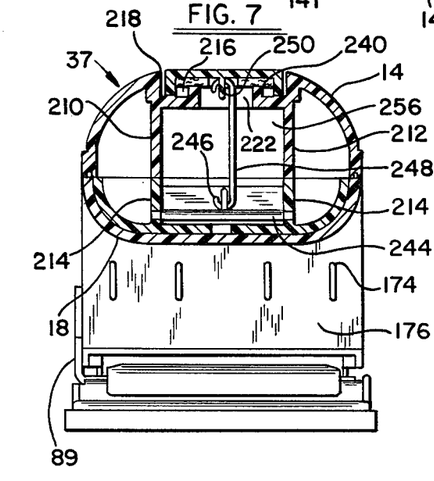
FIG. 7 is a rear elevational view, partly in section, taken along line 7—7 of FIG. 4, illustrating the switching system of the present invention.

The interfit system 33 also provides structure for mounting the switching system 37. Referring to FIGS. 4 and 7, wall 202 extends rearwardly, becoming two parallel upper valve chamber walls 210, 212. Between each wal 202, 210 and wall 202, 212, is located a downwardly-extending tab 214.

Now referring to FIGS. 4, 5 and 7, a toggle well 216 is formed in the upper surface 218 of the upper handle 14. Toggle pivot brackets 220 are formed in each side of the toggle well 216, and a bypass aperture 222 is located in well 216 forwardly of the toggle pivot brackets 220. Two downwardly-extending internally threaded posts 217 are located between walls 210 and the outer wall of upper handle 14.

The final element of the interfit system 33 is the tapered receptacle 22, which includes a lower surface or clamshell base 224 upon which are formed walls 226, 228. A stepped portion 230 is located forwardly of walls 226, 228. An integral tapered hoop portion 232 extends upwardly and rearwardly of the walls 226, 228 and is sized to tightly accommodate air hose fitting 24 (FIGS. 1 and 2). Two hollow bosses 234 extend upwardly between the walls 226, 228 and the clamshell base 224.

Again as shown FIG. 4, the switching system 37 includes a double flap valve 236, a first flap valve being a toggle lever 238 pivotally mounted on brackets 220 such that its upper surface is substantially flush with the upper surface of upper handle 14. The toggle lever 238 is marked "on" at its forward position, and "off" at its rearward position (FIG. 2). Referring to FIG. 7, a felt gasket 240 is mounted on the underside of the toggle lever 238 above the bypass aperture 222, serving as an air seal. A coil spring 241 between the upper handle 14 and the toggle lever 238 normally biases the toggle 238 "off", as shown in phantom in FIG. 4. A lower flap valve 242 has an integral pivot rod 244 at its rearmost end, and is free at its front-most end, being pivotally connected at 246 to a connecting rod 248, which itself is pivotally connected at 250 to the toggle lever 238.

To assemble the interfit system 33 the switching system 37 is mounted in the upper handle 14 such that the flap valve pivot rod 244 is located immediately below tabs 214 of the upper handle 14. Tapered receptacle 22 is then positioned such that pivot rod 244 is trapped between tabs 214 and stepped portion 230, hollow bosses 234 are adjacent posts 217, and hoop portion 232 is nested within the rear of the upper handle 14. Fasteners 252 complete the connection between the upper handle 14 and tapered receptacle 22. The upper handle 14 is then positioned above lower housing 18 such that resonant chamber 206 is above the holes 184 in nozzle cover plate 178, the downwardly extending post (not shown) is placed immediately above small mounting hole 182, and stepped portion 230 of the tapered receptacle 22 covers rear groove 138. Fasteners 20 are then inserted through the upper handle 14 downwardly into the small mounting hole 182 and the three vertical posts 168, then threadedly engaging mounting plate 110.

The complete interfit system 33 provides a quickly-assembled, sealed set of air chambers, as follows: The upper handle wall 202 mates with lower housing walls 141, 142 to form a turbine chamber 254; walls 210, 212 of the upper handle 14 mate with walls 148 of the lower housing 18 and walls 214 of the receptacle 22. Together with wall 150, the resultant structure forms a valve chamber 256.

Figure 8:
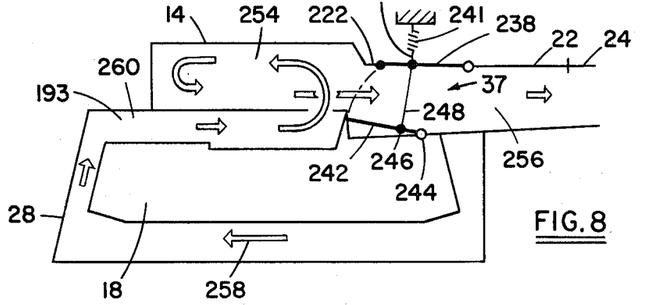
FIG. 8 is an elevational schematic view illustrating air flow in the sanding tool when the sanding tool is connected to a source of vacuum, the switch of the present invention being "on".

As shown in FIGS. 4, 8 and 9(a) through 9(d), in operation, when the sander is connected to a vacuum source, and toggle lever 238 is depressed "on", air travels inwardly through nozzle 193 into the turbine chamber 254. As air drives turbine 40, the air moves upwardly and is exhausted through valve chamber 256, which acts as a passageway intermediate the turbine 40 and the vacuum source. Referring to FIG. 8, arrows 258 illustrate this air flow, with the sanding tool 10 connected to a vacuum source and the toggle lever 238 "on". Airflow is directed by the shroud 28 into nozzle 193, and creates a pressure drop 260 at the nozzle 193.

Figure 9A:
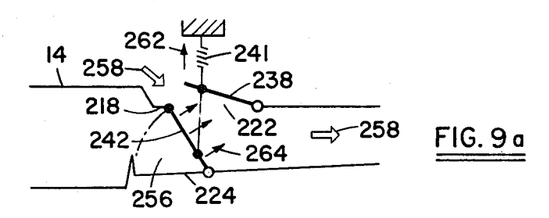
FIG. 9a is an elevational schematic detail view of the system illustrated in FIG. 8 showing the airflow when the sanding tool is connected to a source of vacuum but the switch of the present invention turned "off".

FIGS. 9a through 9d provide a more detailed illustration of the sequence of operation of the switching system 37. Referring to FIG. 9a, the sanding tool 10 is shown connected to the vacuum source with the toggle lever 238 "off", opening the bypass aperture 222 to ambient air. The spring 241 biases the toggle lever 238 "open" in the direction shown by arrow 262. This forces the lower flap valve 242 against the upper surface 218 of upper handle 14, closing the valve chamber 256 to the turbine chamber 254. A pressure differential (shown by arrows 264) is thereby created across the lower flap valve, augmenting the force 262 exerted by spring 241.

Figure 9B:
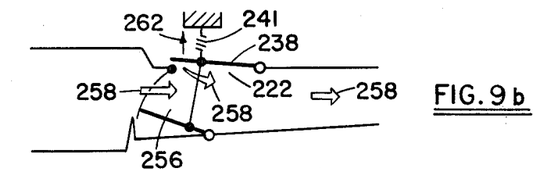
FIG. 9b is an elevational schematic detail view of the system illustrated in FIG. 8 showing the airflow as the switch of the present invention is turned "on".

Referring to FIG. 9b, the operator is depressing the toggle lever against the force exerted by spring 241. Air flows through the bypass aperture 258 and the valve chamber 256, as shown by arrows 258.

Figure 9C:
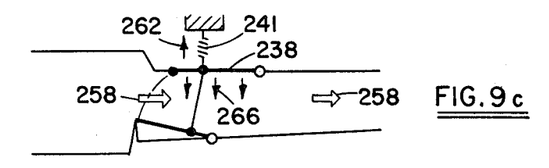
FIG. 9c is an elevational schematic detail view of the system illustrated in FIG. 8 showing the airflow and pressure differential when the switch of the present invention is fully "on".

Now referring to FIG. 9c, when the bypass aperture 222 is closed by toggle lever 238, the air flow (arrows 258) originates at nozzle 193 and flows from turbine chamber 254 through the passageway or valve chamber 256. A pressure drop 260 is thereby created at nozzle 193, which in turn generates a pressure differential 266 across the bypass aperture 258. The spring 241 is selected to exert a force 262 which is less than the effect of pressure differential 256, so that the toggle lever 238 continues to close the bypass aperture 222 without operator assistance, until the toggle lever 238 is depressed "off", or until the vacuum source is disconnected from the tool 10 or no longer produces a vacuum.

Figure 9D:
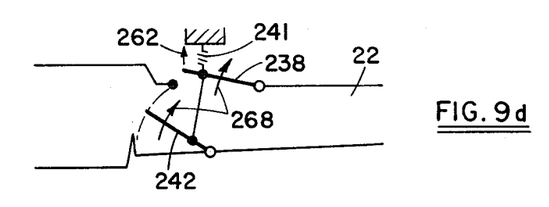
FIG. 9d is an elevational schematic detail view of the system illustrated in FIG. 8, showing the switch of the present invention being responsive to biasing means to turn the tool "off" when the vacuum source is no longer connected to the sanding tool or no longer produces a vacuum.

The latter condition is illustrated by FIG. 9d. A vacuum is no longer present in the vacuum line receptacle 22. Therefore the pressure drop 260 at the nozzle 193 no longer exists, which eliminates the pressure differential 266 across the bypass aperture 222. The spring 241 then exerts sufficient force 262 to move both the toggle lever 238 and the lower flap valve 242 upwardly to the "off position" in the direction shown by arrows 268.

It will be understood that various changes in the details, materials, arrangements of parts and operating conditions which have been herein described and illustrated in order to explain the nature of the invention may be made by those skilled in the art within the principles and scope of the invention.

What is claimed is:

1. A switching system for a tool driven by a turbine rotatively mounted in a housing connected to a source of vacuum, comprising:
   (a) passageway means in the housing for communicating the turbine with the source of vacuum;
   (b) the turbine being driven when gas flows through the passageway means from the turbine to the source of vacuum;
   (c) the housing having aperture means for communicating ambient gas with the source of vacuum;
   (d) bypassing means connected to the housing for selectively switching from a first position for driving the turbine to a second position for stopping the turbine;
   (e) the first position permitting gas to flow from the turbine to the source of vacuum, and the second position permitting ambient gas to flow from the aperture means to the source of vacuum;
   (f) biasing means for normally urging the bypassing means to stop the turbine, but insufficient to overcome a pressure differential at the aperture means when the bypassing means has been switched to drive the turbine.

2. The combination claimed in claim 1, wherein:
   (a) the housing including an exterior wall having an external surface in contact with ambient air;
   (b) the housing further including a valve chamber intermediate the turbine and the source of vacuum;
   (c) the aperture means including an aperture formed through the exterior wall and communicating with the valve chamber; and
   (d) the bypassing means including a first valve in the valve chamber operatively associated with a second valve adjacent the aperture.

3. The combination claimed in claim 2, wherein:
   (a) the valve chamber being located in the passageway means and defining an upper surface and a lower surface;
   (b) the aperture being formed in the upper surface;
   (c) the first valve being a lower flap valve pivotally mounted adjacent the lower surface and having a free end;
   (d) the free end being moveable to engage the upper surface intermediate the turbine to open and close the passageway to activate and stop the turbine, respectively; and
   (e) the second valve being closed when the lower valve is open, and vice-versa.

4. The combination claimed in claim 3, wherein:
   (a) the second valve including a upper flap valve pivotally connected to the housing;
   (b) the upper flap valve being moveable to open and close the aperture;
   (c) a pressure differential being developed across the aperture when the lower flap valve is opened and the upper flap valve is closed; and
   (d) the pressure differential being sufficient to cause the upper flap valve to continue to close the aperture.

5. The combination claimed in claim 4, wherein:
(a) the tool including a nozzle;
(b) a pressure drop being formed across the nozzle when the lower flap valve is open; and
(c) the pressure differential across the aperture being responsive to the pressure drop across the nozzle.

6. The combination claimed in claim 5, further comprising:
(a) a link member being pivotally connected at one end to the upper flap valve and at the other end to the lower flap valve; and
(b) the biasing means including a spring connected between the housing and the upper flap valve.

7. The combination claimed in claim 6, wherein:
(a) the tool being a hand-held portable sanding tool;
(b) the upper flap valve being a toggle lever which closes responsive to hand pressure;
(c) the spring exerting a force less than that resulting from the pressure differential across the aperture when the toggle lever is closed, such that the toggle lever remains closed without hand pressure on the toggle lever.

8. The combination claimed in claim 7, wherein:
(a) the linking member passing through the aperture; and
(b) means connected to the toggle lever for providing an air seal at the aperture.

9. The combination claimed in claim 6, wherein:
(a) the pressure differential across the aperture being reduced when the source of vacuum is removed from the tool or no longer produces a vacuum.
(b) the spring being responsive to the reduction in the pressure differential to open the second flap valve and close the first flap valve.

10. A switching system for a vacuum-driven tool operating in an ambient atmosphere, comprising:
(a) a housing having a turbine chamber, a valve chamber connected to the turbine chamber, and a connection portion connected to the valve chamber and communicating with a source of vacuum;
(b) the housing further defining a bypass aperture communicating with the valve chamber;
(c) a switch connected to the housing adjacent the bypass aperture and moveable to open and close the bypass aperture to ambient atmosphere;
(d) a valve mounted in the valve chamber normally closing the connection portion to the turbine chamber;
(e) means for linking the switch to the valve so that the valve opens the turbine chamber to the connection portion upon movement of the switch to close the bypass aperture; and
(f) means responsive to the absence of vacuum at the connection portion for causing the switch to open the bypass aperture.

11. A sanding tool powered by a source of vacuum and having a housing, comprising;
(a) a platen supported from the housing;
(b) a turbine rotatably mounted in the housing and drivingly connected to the platen;
(c) the housing including a connection portion for communicating the turbine with the source of vacuum to rotate the turbine;
(d) a valve mounted in the housing between the turbine and the connection portion and operative to open and close the turbine to and from, respectively, the source of vacuum;
(e) the housing defining a bypass aperture adjacent to and communicating with the connection portion;
(f) switching means for closing and opening the bypass aperture to ambient atmosphere; and
(g) means operatively associated with the switching means for opening the valve and for maintaining the valve open responsive to pressure differential.

12. An air-driven sanding tool having a housing connected to a source of vacuum, comprising:
(a) a platen supported from the housing;
(b) a turbine rotatively mounted in the housing and drivingly connected to the platen;
(c) the housing including a channel communicating air from the turbine to the source of vacuum;
(d) a bypass formed in the housing adjacent the channel;
(e) a valve connected to the channel intermediate the turbine and the source of vacuum and being selective to switch the source of vacuum from communication with the bypass to communication with the turbine;
(f) the turbine being inoperative when the valve communicates the source of vacuum with the bypass, and being operative when the valve communicates the source of vacuum with the turbine; and
(g) the valve being responsive to air pressure differential to maintain the source of vacuum in communication with the turbine after the turbine is made operative.

13. The combination claimed in claim 12, further comprising biasing means connected to the housing for normally urging the valve to communicate the source of vacuum with the bypass.

14. The combination claimed in claim 13, wherein:
(a) the valve being a double flap valve;
(b) one flap valve being mounted in the channel; and
(c) the other flap valve being connected to the housing adjacent the bypass.

15. The combination claimed in claim 14, wherein:
(a) the bypass including an aperture formed in the housing;
(b) the flap valve having an upper flap valve and a lower flap valve;
(c) the upper flap valve being pivotably connected to the housing and being moveable to selectively open and close the aperture; and
(d) the lower flap valve being pivotably mounted in the channel to open and close the channel.

16. The combination claimed in claim 15, further comprising linking means for connecting the upper flap to the lower flap such that when the upper flap is closed, the lower flap is open, and vice-versa.

17. The combination claimed in claim 16, wherein a pressure differential across the aperture acts upon the upper flap valve when the lower flap valve is open.

18. The combination claimed in claim 17, wherein the pressure differential exerts a force on the upper flap valve greater than, and in opposition to, the force exerted thereon by the biasing means, when the upper flap valve is closed.

19. The combination claimed in claim 19, further comprising sealing means for providing an air seal adjacent the engagement of the upper flap with the aperture.

20. The combination claimed in claim 19, wherein:
(a) the upper flap valve being substantially flush with the housing exterior when closing the aperture; and
(b) the biasing means including a spring connecting the housing to the upper flap valve.

21. An air powered sanding tool having a housing, comprising:

(a) a platen operatively connected to the housing;
(b) the housing having a nozzle portion and a valve portion;
(c) a turbine being drivingly connected to the platen and being rotatively connected to the housing intermediate the nozzle portion and the valve portion;
(d) the valve portion being connected to a source of vacuum;
(e) the housing defining a bypass aperture communicating with the valve portion;
(f) a double flap valve being connected to the valve portion and having an upper flap valve and a lower flap valve;
(g) the upper flap valve being pivotably connected to the housing and operative to selectively open and closed the bypass aperture to ambient air;
(h) the lower flap valve being pivotably mounted in the valve chamber and operative to close and open the valve chamber to air flow from the nozzle to the turbine; and
(i) a linking member pivotally connecting the upper flap valve to the lower flap valve such that the lower flap valve is closed when the upper flap valve opens the bypass aperture, and the lower flap valve is open when the upper flap valve closes the bypass aperture.

* * * * *